(12) United States Patent
Chen et al.

(10) Patent No.: US 9,807,806 B2
(45) Date of Patent: Oct. 31, 2017

(54) METHOD FOR ACCESSING A NETWORK IN ELECTRONIC SYSTEM AND ASSOCIATED PORTABLE DEVICE

(71) Applicant: MediaTek Inc., Hsin-Chu (TW)

(72) Inventors: Po-Yu Chen, Hsinchu (TW); Chih-Hsiang Hsiao, Taipei (TW); Hua Wu, Jhubei (TW); Chi-Hsuan Lin, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/859,622

(22) Filed: Sep. 21, 2015

(65) Prior Publication Data
US 2016/0192409 A1 Jun. 30, 2016

Related U.S. Application Data

(60) Provisional application No. 62/096,739, filed on Dec. 24, 2014.

(51) Int. Cl.
*H04W 4/00* (2009.01)
*H04W 76/02* (2009.01)
(Continued)

(52) U.S. Cl.
CPC ............ *H04W 76/02* (2013.01); *H04L 67/16* (2013.01); *H04W 4/008* (2013.01); *H04W 48/18* (2013.01); *H04W 52/0209* (2013.01); *Y02B 60/50* (2013.01)

(58) Field of Classification Search
CPC .. H04B 7/0871; H04B 7/0877; H04B 7/0868; H04B 7/18526; H04B 7/18539; H04L 41/18
(Continued)

(56) References Cited

U.S. PATENT DOCUMENTS 9,241,257 B1 * 1/2016 Kim ..................... H04W 8/22
2006/0025118 A1 * 2/2006 Chitrapu ............... H04M 3/436
455/414.3
(Continued)

FOREIGN PATENT DOCUMENTS

| EP | 2782397 A1 | 9/2014 |
| WO | WO 2015/127056 | 8/2015 |
| WO | WO2015/127056 A2 * | 8/2015 |

OTHER PUBLICATIONS

Hao, T., et al.; "ESMO an Energy-Efficient Mobile Node Scheduling Scheme for Sound Sensing;" IEICE Trans. Commun.; vol. E93-B; No. 11; Nov. 2010; pp. 2912-2934.
(Continued)

*Primary Examiner* — Ping Hsieh
(74) *Attorney, Agent, or Firm* — McClure, Qualey & Rodack, LLP (57) ABSTRACT

A method for accessing a network in an electronic system and associated portable device are provided. The portable device includes; a transceiver, supporting a plurality of predetermined communication protocols; and a processor, configured to connect the portable device to a connectivity service device in an electronic system via the transceiver when the portable device enters a coverage region of the connectivity service device. The connectivity service device retrieves service information from a plurality of electronic devices that are connected to the connectivity service device, to build a service list. The processor retrieves the service list from the connectivity service device, and determines a service from the service list to be used for communicating with the plurality of the electronic devices.

12 Claims, 5 Drawing Sheets

(51) Int. Cl.
*H04W 48/18* (2009.01)
*H04L 29/08* (2006.01)
*H04W 52/02* (2009.01)

(58) Field of Classification Search
USPC ................ 455/41.1, 41.2, 41.3, 456.1, 552.1
See application file for complete search history.

(56) References Cited

U.S. PATENT DOCUMENTS

| | | |
|---|---|---|
| 2009/0010189 A1 | 1/2009 | Nagra et al. |
| 2010/0033424 A1 | 2/2010 | Kabasawa et al. |
| 2012/0135683 A1* | 5/2012 | Lee ........................ H04L 63/101 |
| | | 455/41.2 |
| 2013/0106603 A1 | 5/2013 | Weast et al. |
| 2014/0286322 A1* | 9/2014 | Ye .......................... H04W 48/08 |
| | | 370/338 |
| 2014/0295913 A1* | 10/2014 | Gupta ................... H04W 74/02 |
| | | 455/552.1 |
| 2015/0156030 A1 | 6/2015 | Fadell et al. |
| 2015/0341849 A1* | 11/2015 | Lee ........................ H04W 48/16 |
| | | 455/41.2 |
| 2016/0050114 A1 | 2/2016 | Archibald et al. |

OTHER PUBLICATIONS

Hemminki, S., et al.; "Poster Abstract CoSense-A Collaborative Sensing Platform for Mobile Devices;" pp. 1-2.

\* cited by examiner

METHOD FOR ACCESSING A NETWORK IN ELECTRONIC SYSTEM AND ASSOCIATED PORTABLE DEVICE

CROSS REFERENCE TO RELATED APPLICATIONS

This application claims the benefit of U.S. Provisional Application No. 62/096,739, filed on Dec. 24, 2014, the entirety of which is incorporated by reference herein.

BACKGROUND OF THE INVENTION

Field of the Invention

The invention relates to a method for accessing a network and an associated portable device, and, in particular, to a method for accessing a network in an electronic system and an associated portable device capable of accessing a service list provided by a connectivity service device in the electronic system.

Description of the Related Art

With recent advances in technology, portable devices have become more and more popular. Currently, a portable device may have at least one connectivity technology, e.g. Bluetooth, Wifi, etc., to connect to other electronic devices, thereby forming a network. However, if a user wants to obtain information about the services of other electronic devices in the network, he has to turn on many connectivity modules of his portable device for discovering services provided by other electronic devices, and it will quickly drain the battery power of his portable device. In addition, not all portable devices have rich connectivity technology for each service, and the number of connection channels is also limited. Thus, it will result in a poor user experience due to short battery life and limited services.

Accordingly, there is demand for a method for accessing a network in an electronic system and an associated portable device to address the aforementioned issues.

BRIEF SUMMARY OF THE INVENTION

A detailed description is given in the following embodiments with reference to the accompanying drawings.

A portable device is provided. The portable device includes; a transceiver, supporting a plurality of predetermined communication protocols; and a processor, for connecting the portable device to a connectivity service device in an electronic system via the transceiver when the portable device enters a coverage region of the connectivity service device. The processor retrieves the service list from the connectivity service device, and determines a service from the service list to be used for communicating with the plurality of electronic devices.

A method for accessing a network in an electronic system is provided. The electronic system comprises a connectivity service device and a plurality of electronic devices, and the plurality of electronic devices are connected to the connectivity service device. The method includes the steps of: connecting a portable device to a connectivity service device in an electronic system when the portable device enters a coverage region of the connectivity service device; retrieving the service list from the connectivity service device by the portable device; and determining a service from the service list to be used for communicating the portable device with the plurality of electronic devices.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
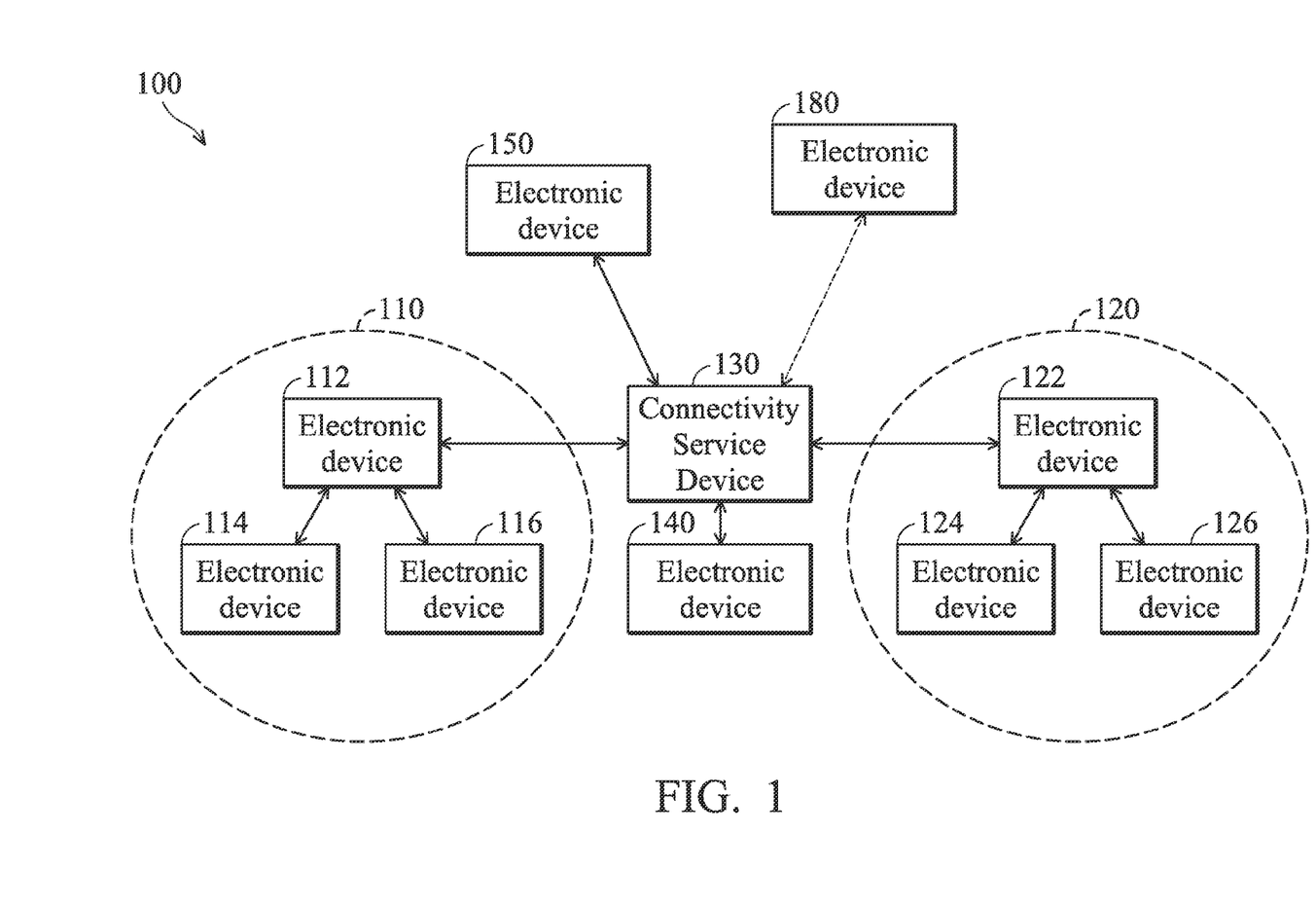
FIG. 1 is a diagram of an electronic system in accordance with an embodiment of the invention.

FIG. 1 is a diagram of an electronic system 100 in accordance with an embodiment of the invention. The electronic system 100 comprises one or more groups 110 and 120, at least one connectivity service device 130, and one or more electronic devices 140 and 150. For example, the connectivity service device 130 may be a smart hub or a smart access point which provide connectivity services to the electronic devices in the electronic system 100. Alternatively, the connectivity service device 130 may be a smartphone or a tablet PC.

Each group comprises a plurality of electronic devices. For example, the group 110 comprises electronic devices 112, 114, and 116, where the electronic devices 112, 114, and 116 are a smartphone, a smart watch, and a smart wristband, respectively. The electronic devices 114 and 116 are connected to the electronic device 112 using a wireless communication protocol such as Wifi or Bluetooth Low Energy (BLE), but the invention is not limited thereto. The group 110 is connected to the connectivity service device 130 via the electronic device 112. That is, the electronic devices 114 and 116 can indirectly access the network provided by the connectivity service device 130 via the electronic device 112.

Similarly, the group 120 comprises electronic devices 122, 124, and 126, where the electronic devices 122, 124, and 126 are a tablet PC, a smart wristband, and a smart watch, respectively. The electronic devices 124 and 126 are connected to the electronic device 122 using a wireless protocol such as Wifi or BLE, but the invention is not limited thereto. The group 120 is connected to the connectivity service device 130 via the electronic device 122. That is, the electronic devices 124 and 126 can indirectly access the network provided by the connectivity service device 830 via the electronic device 122.

For example, the electronic device 140 may be a smart TV, and the electronic device 150 may be a smart watch. The electronic devices 140 and 150 are directly connected to the connectivity service device 130 using a wireless communication protocol such as Wifi or BLE. It should be noted that the configuration of the electronic devices and the connectivity service device shown in FIG. 1 is an example used for ease of description. One having ordinary skill in the art will appreciate that the arrangement and the number of the electronic devices and the connectivity service device can be alternated according to practical situations.

In an embodiment, the connectivity service device 130 may build a service list including the electronic devices which are already connected to the connectivity service device 130. The service list also includes electronic devices capable of providing different types of sensor services, such as radio frequency (RF) services, e.g. Wifi, LTE, Wireless USB, ZigBee, . . . etc., GPS service, RFID service, . . . etc, but the invention is not limited thereto. When a portable device 180 enters the coverage region of the connectivity service device 130, the portable device 180 may ask the connectivity service device 130 whether any service nearby is available via a low-power connection, e.g. BLE, and then the connectivity service device 130 may provide the service list to the portable device 180. Thus, the portable device 180 may select the most appropriate service from the services in the service list, and then connect to the electronic device associated with the selected service using the communication protocol compatible with the selected service.

Alternatively, the portable device 180 may select the most appropriate service from the services in the service list, and exchange data with other electronic devices through the connectivity service device 130 using the selected service. Specifically, the portable device 180 is connected to the connectivity service device 130 using a low-power communication protocol, e.g. BLE, and other electronic devices are connected to the connectivity service device 130 using a high-speed communication protocol, e.g. LTE, Wifi, or Zigbee . . . etc. Thus, the portable device 180 uses a low-power connection to retrieve RF data (e.g. RF signals) or sensor data with other electronic devices in the electronic system 100 through the connectivity service device 130, and the RF circuitry or sensors on the portable device 180, that are not associated with the selected service can be turned off to reduce power consumption.

Figure 2:
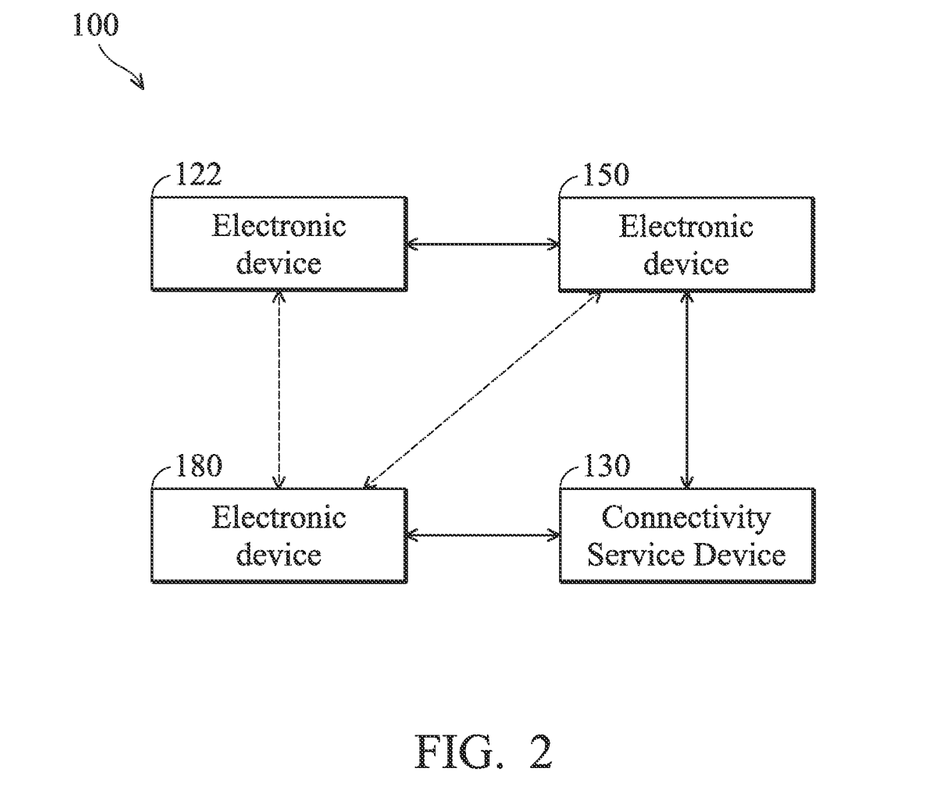
FIG. 2 is a diagram of the electronic system in accordance with another embodiment of the invention.

FIG. 2 is a diagram of the electronic system in accordance with another embodiment of the invention. In the first scenario, the connectivity service device 130 is a smartphone placed in a user's home, and the connectivity service device 130 may gather the services provided by other electronic devices and build a service list such as a Wifi service provided by the electronic devices 122 and 150. For example, the electronic device 122 is a tablet PC and the electronic device 150 is a smart TV, and the electronic device 122 is connected to the connectivity service device 130 through the electronic device 150. The portable device 180 is a smart watch supporting BLE and Wifi protocols. When the user is wearing the portable device 180 and going back to his home, the portable device 180 may detect that the connectivity service device 130 is a service provider, and then the portable device 180 may ask the connectivity service device 130 for the service list via a low-power connection, e.g. BLE, and thus the portable device 180 may find that the electronic devices 122 and 150 providing the Wifi service are within the service list. Then, the portable device 180 may turn on the Wifi module (not shown) and connect to the electronic devices 122 and 150 using the Wifi protocol. In other words, the portable device 180 does not need to communicate with other electronic devices other than the connectivity service device 130 before retrieving the service list from the connectivity service device 130.

In the second scenario, referring to FIG. 1, the connectivity service device 130 gathers service information from other electronic devices which are connected to the connectivity service device 130, and the portable device 180 has one or more wireless communication functions such as Wifi, Bluetooth, LTE, or ZigBee . . . etc, but the invention is not limited thereto. When the portable device 180 enters the coverage region of the connectivity service device 130 of the electronic system 100, the portable device 180 first asks the connectivity service device 130 whether any service nearby is available via a low-power connection, e.g. BLE, and then the connectivity service device 130 may provide the service list to the portable device 180. Then, the portable device 180 determines the most appropriate function to be used for direct communication with other electronic devices in the electronic system 100 according to the service list, and then the portable device 180 may automatically turn on the most appropriate function and turn off other unselected functions, thereby reducing power consumption.

Figure 3:
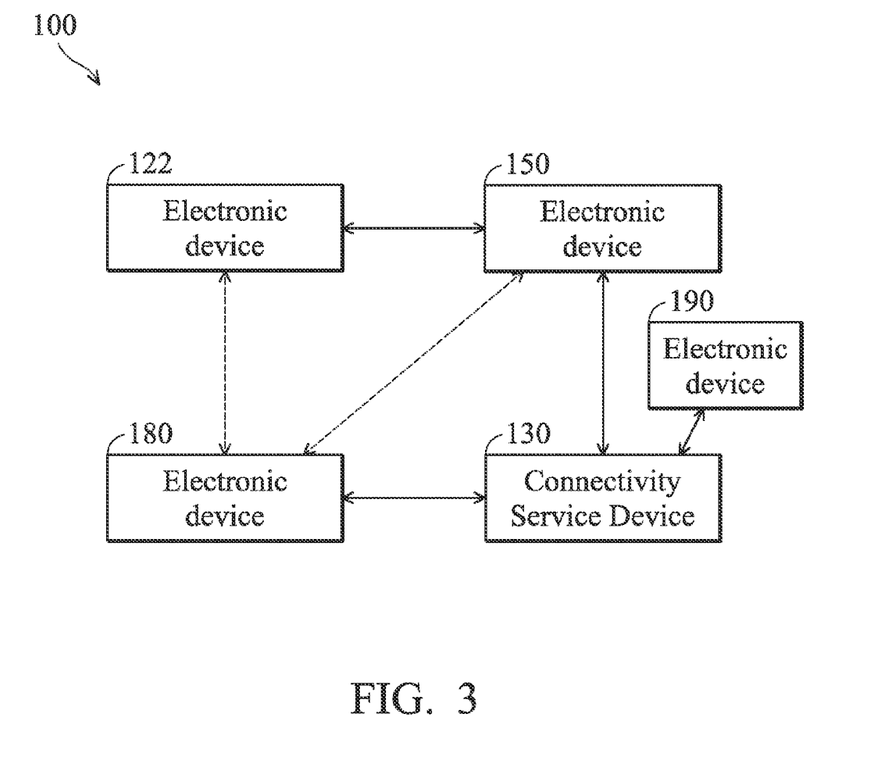
FIG. 3 is a diagram of the electronic system in accordance with yet another embodiment of the invention.

FIG. 3 is a diagram of the electronic system in accordance with yet another embodiment of the invention. In the third scenario, the connectivity service device 130 gathers service information from other electronic devices 122, 150, and 190 which are connected to the connectivity service device 130, and the portable device 180 has one or more wireless communication functions such as Wifi, Bluetooth, LTE, or ZigBee, etc, but the invention is not limited thereto. For example, the portable or electronic devices 122, 150, 180, and 190 are a tablet PC, a smart TV, a smart watch, and a smart wristband, respectively. When the user is wearing the portable device 180 and entering the coverage region of the connectivity service device 130 of the electronic system 100, the portable device 180 first asks the connectivity service device 130 whether any service nearby is available via a low-power connection, e.g. BLE, and then the connectivity service device 130 may provide the service list to the portable device 180. The portable device 180 determines the most appropriate wireless communication function, e.g. BLE or Wifi, according to the service list, and then exchanges required data with other electronic devices in the electronic system 100 through the connectivity service device 130 using the selected wireless communication function. Specifically, the portable device 180 does not need to communicate with other electronic devices 122, 150, and 190 in the electronic system 100 before retrieving the service list from the connectivity service device 130. Data transmission between the portable device 180 and the connectivity service device 130 is performed using a low-power communication protocol, e.g. BLE, and data transmission between the connectivity service device 130 and other electronic devices is performed using a high-speed communication protocol, e.g. LTE or Wifi. Accordingly, the power consumption of the portable device 180 can be reduced in the third scenario.

Figure 4:
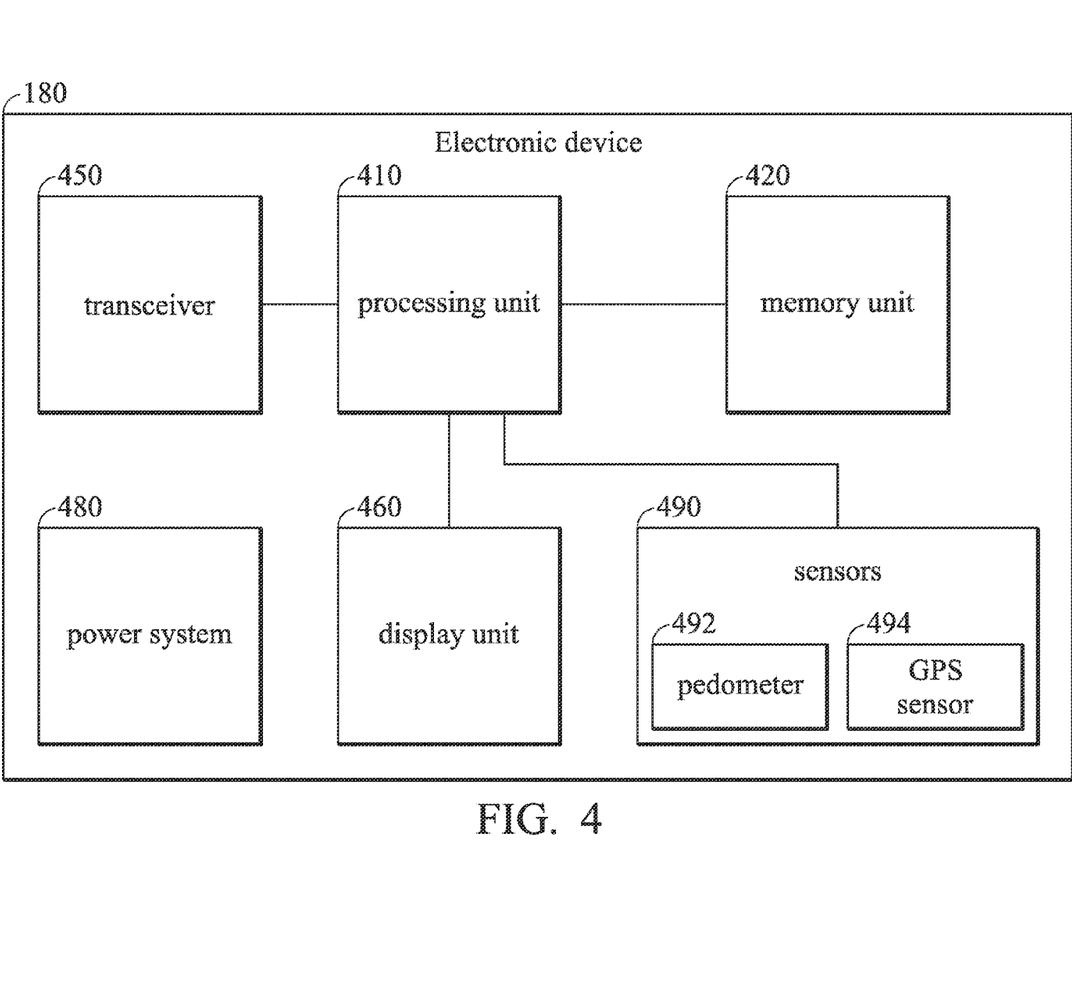
FIG. 4 is a block diagram illustrating the portable device 180 in accordance with an embodiment of the invention.

FIG. 4 is a block diagram illustrating the portable device 180 in accordance with an embodiment of the invention. The portable device 180 comprises a processing unit 410, a memory unit 420, a transceiver 450, a display unit 460, a power system 480 and one or more sensors 490. The processing unit 410 may include one or more processors and/or microcontrollers (MCU). The memory unit 420 may be applied as a main memory for the processing unit 410 for executing software routines and other selective storage functions. For example, the memory unit 420 may comprise a non-volatile memory and a volatile memory (not shown in FIG. 4). The non-volatile memory is capable of holding instructions and data without power and may store the software routines for controlling the portable device 180 in the form of computer-readable program instructions. The non-volatile memory, e.g. flash memory, ROM . . . etc., may also contain a user interface application, which provides functionality for the portable device 180 and can output a graphical user interface on the display unit 460, which may be a touch-sensitive display, i.e. a "touch screen".

The transceiver 450 is configured to connect the portable device 180 to a remote electronic device via a wireless communication protocol, and transceive packet data during the connection. For example, the BLE or NFC protocols are supported by the transceiver, but the invention is not limited thereto.

The power system 480 is configured to power the various components of the portable device 180. The power system 480 may include a power management system, one or more power sources (e.g., battery, alternating current (AC), a recharging system, a power failure detection circuit, a power converter or inverter, a power status indicator (e.g. a light-emitting diode (LED)) and any other components associated with the generation, management, and distribution of power in the portable device 180.

The sensors 490, which may include a pedometer 492 and a global positioning system (GPS) sensor 494, couples to the processing unit 410. In an embodiment, the pedometer 492 is configured to count each step a person takes by detecting the motion of the person's hips, and the pedometer 492 may be implemented by using micro-electro mechanical system (MEMS) inertial sensors such as an accelerometer, a gyroscope, and/or a magnetometer (not shown).

Figure 5:
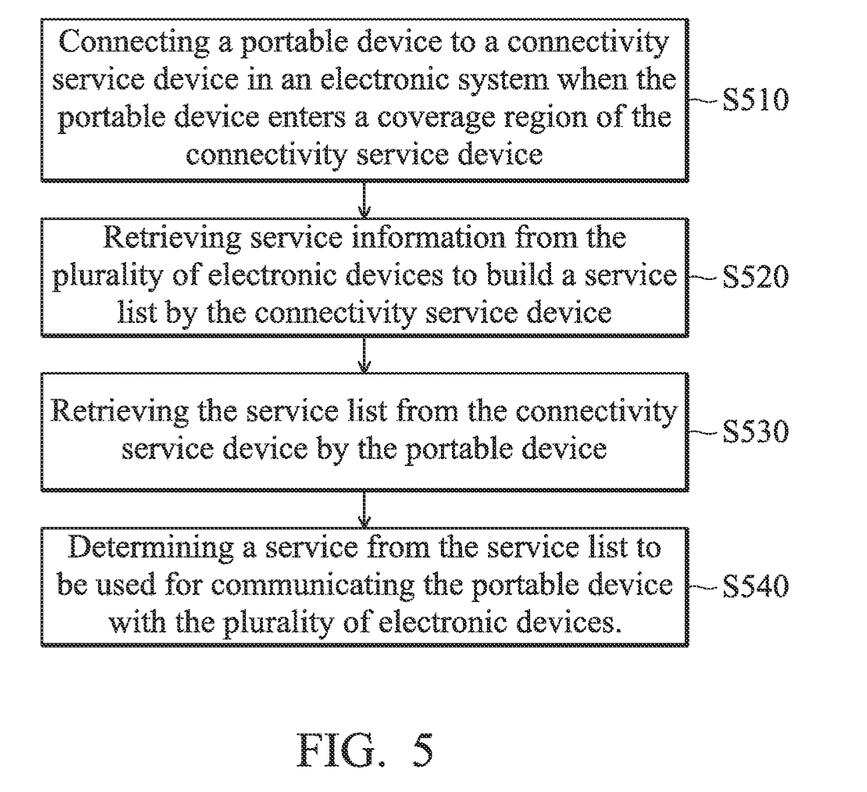
FIG. 5 is a flow chart of a method for accessing a network in an electronic system in accordance with an embodiment of the invention.

FIG. 5 is a flow chart of a method for accessing a network in an electronic system in accordance with an embodiment of the invention. In step S510, the portable device 180 is connected to the connectivity service device 130 in the electronic system 100 when the portable device 180 enters a coverage region of the connectivity service device 130. In step S520, the connectivity service device 130 retrieves service information from the electronic devices in the electronic system 100 to build a service list.

In step S530, the portable device 180 retrieves the service list from the connectivity service device. In step S540, the portable device 180 determines a service from the service list to be used for communicating the portable device 180 with the plurality of electronic devices.

In view of the above, a method for accessing a network in an electronic system and associated portable device are provided. The method and the associated portable device are capable of connecting the portable device to the connectivity service device to retrieve a service list including information about services provided by electronic devices being connected to the connectivity service device. Thus, the portable device does not need to turn on all connectivity modules for discovering the services nearby, and is capable of connecting to other electronic devices with the most appropriate service according to the service list. In addition, the portable device uses a low-power communication protocol to retrieve the service list from the connectivity service device, and the portable device further exchanges required data with other electronic devices through the connectivity service device using the selected communication protocol.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable device, comprising;
    a transceiver, supporting a plurality of predetermined communication protocols; and
    a processor, configured to connect the portable device to a connectivity service device in an electronic system via the transceiver when the portable device enters a coverage region of the connectivity service device, wherein the processor retrieves a service list from the connectivity service device, the service list comprising services available for use in the coverage region, wherein each of the services corresponds to a communications protocol, and wherein the processor further determines a service from the service list to be used for communicating with a plurality of electronic devices in the coverage region,
    wherein the portable device, the connectivity service device, and the electronic devices in the coverage region are within a local area network,
    wherein the service list comprises one or more wireless communications protocols and/or types of sensors employed on the plurality of electronic devices,
    wherein the determined service is selected from one of the predetermined communication protocols used by the portable device, and the portable device turns off radio frequency circuitry of the portable device which is not associated with the determined service, and transceives radio frequency signals from one of the electronic devices through the connectivity service device according to the service list.

2. The portable device as claimed in claim 1, wherein the connectivity service device retrieves service information from a plurality of electronic devices, that are connected to the connectivity service device, to build the service list.

3. The portable device as claimed in claim 1, wherein the processor retrieves the service list from the connectivity service device using a low-power communication protocol in the plurality of predetermined communication protocols.

4. The portable device as claimed in claim 3, wherein the low-power communication protocol is Bluetooth Low Energy.

5. The portable device as claimed in claim 1, wherein the determined service is selected from one of the types of sensors, and the portable device turns off the remaining types of the sensors on the portable device and retrieves sensor data from the sensors employed on the plurality of electronic devices associated with the determined service through the connectivity service device according to the service list.

6. The portable device as claimed in claim 1, wherein the determined service is one of the plurality of predetermined communication protocols used by the portable device to communicate with the plurality of electronic devices in the coverage region.

7. A method for accessing a network in an electronic system, wherein the electronic system comprises a connectivity service device and a plurality of electronic devices, and the plurality of electronic devices are connected to the connectivity service device, the method comprising:
    connecting a portable device to a connectivity service device in an electronic system when the portable device enters a coverage region of the connectivity service device;
    retrieving the service list from the connectivity service device by the portable device, the service list comprising services available for use in the coverage region, wherein each of the services corresponds to a communications protocol; and determining a service from the service list to be used for communicating the portable device with a plurality of electronic devices in the coverage region; and connecting the portable device with the plurality of electronic devices using the predetermined communication protocol of the determined service, wherein the portable device, the connectivity service device, and the electronic devices in the coverage region are within a local area network, wherein the portable device retrieves the service list from the connectivity service device using a low-power communication protocol in the plurality of predetermined communication protocols, wherein the determined service is one of the predetermined communication protocols used by the portable device, and the method further comprises:

turning off radio frequency circuitry of the portable device which is not associated with the determined service; and transceiving radio frequency signals from one of the electronic devices through the connectivity service device by the portable device according to the service list.

8. The method as claimed in claim 7, wherein the connectivity service device retrieves service information from a plurality of electronic devices, that are connected to the connectivity service device, to build the service list.

9. The method as claimed in claim 7, wherein the portable device retrieves the service list from the connectivity service device using a low-power communication protocol in the plurality of predetermined communication protocols.

10. The method as claimed in claim 9, wherein the low-power communication protocol is Bluetooth Low Energy.

11. The method as claimed in claim 7, wherein the determined service is selected from one of the types of sensors, and the method further comprises:

turning off a plurality of sensors on the portable device; and utilizing the portable device to retrieve sensor data from the sensors used by the plurality of electronic devices associated with the determined service through the connectivity service device according to the service list.

12. The method as claimed in claim 7, wherein the determined service is one of the plurality of predetermined communication protocols used by the portable device to communicate with the plurality of electronic devices in the coverage region.

* * * * *